United States Patent
Moshier et al.

(10) Patent No.: US 7,805,479 B2
(45) Date of Patent: Sep. 28, 2010

(54) SCALABLE, FASTER METHOD AND APPARATUS FOR MONTGOMERY MULTIPLICATION

(76) Inventors: Michael Andrew Moshier, 840 N. Shaffer St., Orange, CA (US) 92867; Jeff Furlong, 8528 Palo Verde Rd., Irvine, CA (US) 92617

( * ) Notice: Subject to any disclaimer, the term of this patent is extended or adjusted under 35 U.S.C. 154(b) by 1147 days.

(21) Appl. No.: 11/277,758

(22) Filed: Mar. 28, 2006

(65) Prior Publication Data
US 2007/0233769 A1    Oct. 4, 2007

(51) Int. Cl.
*G06F 7/72* (2006.01)
(52) U.S. Cl. .................................................... 708/491
(58) Field of Classification Search .................. None
See application file for complete search history.

(56) References Cited

U.S. PATENT DOCUMENTS

| | | | |
|---|---|---|---|
| 4,200,770 A | 4/1980 | Hellman et al. | |
| 4,405,829 A | 9/1983 | Rivest et al. | |
| 5,231,668 A | 7/1993 | Kravitz | |
| 6,035,317 A | 3/2000 | Guy | |
| 6,151,393 A | 11/2000 | Jeong | |
| 6,182,104 B1 | 1/2001 | Foster et al. | |
| 6,185,596 B1 * | 2/2001 | Hadad et al. | 708/491 |
| 6,424,987 B1 | 7/2002 | Romaine et al. | |
| 6,598,061 B1 | 7/2003 | Symes et al. | |
| 6,748,410 B1 * | 6/2004 | Gressel et al. | 708/491 |
| 6,763,365 B2 | 7/2004 | Chen et al. | |
| 6,963,977 B2 | 11/2005 | Chen et al. | |
| 6,973,470 B2 | 12/2005 | Takahashi et al. | |
| 7,266,577 B2 * | 9/2007 | Ikeda et al. | 708/491 |
| 7,480,691 B2 * | 1/2009 | Okumura | 708/628 |
| 7,543,011 B2 * | 6/2009 | Yoon et al. | 708/491 |
| 2004/0125948 A1 | 7/2004 | Son | |
| 2004/0167952 A1 | 8/2004 | Gueron | |

OTHER PUBLICATIONS

McIvor, C., M. McLoone, and J. V. McCanny. "Modified Montgomery modular multiplication and RSA exponentiation techniques," IEE Proc.-Comput. Digit. Tech., vol. 151, No. 6, pp. 402-408, Nov. 2004.

Daly, A. and W. Marnane. "Efficient architectures for implementing Montgomery modular multiplication and RSA modular exponentiation on reconfigurable logic," Proceedings of the 2002 ACM/SIGDA tenth international symposium on Field-programmable gate arrays, Monterey, CA, Feb. 24-26, 2002.

Blum, T. and C. Paar. "High-Radix Montgomery modular exponentiation on reconfigurable hardware," IEEE Transactions on Computers, vol. 50 No. 7, pp. 759-764, Jul. 2001.

Montgomery, P. L. "Modular multiplication without trial division," Math. Comput., vol. 44, No. 170, pp. 519-521, Apr. 1985.

* cited by examiner

*Primary Examiner*—David H Malzahn

(57) ABSTRACT

Montgomery multiplication can be computed quickly by using carry save adders and parallel multipliers. We present an enhanced technique for very fast Montgomery multiplication that can be used for RSA calculations. This invention utilizes a scalable bit word implementation, suitable for very large bit encryptions. Such designs can be deployed on mid-level FPGAs that have dedicated multiplier logic, on ASICs, or on custom circuits. To our knowledge, our technique yields some of the fastest RSA encryption times to be reported, having area requirements similar to related work. Such circuits can be ideal for increased security in sensitive communication fields.

6 Claims, 12 Drawing Sheets

SCALABLE, FASTER METHOD AND APPARATUS FOR MONTGOMERY MULTIPLICATION

CROSS-REFERENCE TO RELATED APPLICATIONS

Not Applicable

STATEMENT REGARDING FEDERALLY SPONSORED RESEARCH OR DEVELOPMENT

Not Applicable

Field of Invention

The present invention relates generally to arithmetic processing of large integers, with application in cryptographic systems, digital signature systems and other security systems. More particular, the present invention relates to a method and apparatus for performing residual modular multiplication, also known in prior art as Montgomery multiplication.

BACKGROUND OF THE INVENTION: Prior Art

Modular arithmetic for very large moduli is a staple of public-key cryptographic systems including Rivest, Shamir, and Adleman (RSA: U.S. Pat. No. 4,405,829), Diffie-Hellman (DH: U.S. Pat. No. 4,200,770), the Digital Signature Algorithm (DSA: U.S. Pat. No. 5,231,668), Elliptic Curve Cryptosystems (ECC), and the like. Because these systems perform modular exponentiation, typically via a square and multiply method, modular multiplication is a critical bottleneck that has been addressed through dedicated circuits in prior art with limited success.

Residual modular multiplication (Montgomery, P. L., "Modular multiplication without trial division," Math. Comput., vol. 44, no. 170, pp. 519-521, April 1985.) depends on a predetermined parameter R that is relatively prime to the modulus n. We say that a' is a residual representation of a (with respect to R and n) if a·R is congruent to a' modulo n. Residual modular multiplication concerns computing a residual representation of a·b given residual representations of a and b. In other words, given a' and b', residual modular multiplication produces a value u for which u·R is congruent to a'·b' modulo n. The algorithm of Montgomery accomplishes this by eliminating the calculation of a remainder modulo n in favor of a division by R and a remainder with respect to R. By choosing R to be a suitable power of 2, the division becomes a shift operation and the remainder a mask operation. Furthermore, the basic algorithm scales up with numbers represented in a predetermined radix r and predetermined length L, so that $R=r^L$.

Previous implementations of Montgomery multiplication have been developed for hardware, e.g., Takahashi (U.S. Pat. No. 6,973,470), Chen (U.S. Pat. Nos. 6,763,365 and 6,963,977), Monier (U.S. Pat. No. 6,035,317, European Patent 2,679,054), McGregor (U.S. Pat. No. 6,598,061) and Higashi (U.S. Pat. No. 6,151,393), Son (U.S. Patent Application 2004/0167952), Rarick (U.S. Patent Application 2004/0125948), Foster (U.S. Pat. No. 6,182,104). In addition, the recent work of McIvor et al, (C. McIvor, M. McLoone, and J. V. McCanny. "Modified Montgomery modular multiplication and RSA exponentiation techniques," IEE Proc.—*Comput. Digit. Tech.*, vol. 151, no. 6, pp. 402-408, November 2004) specifically targets FPGA hardware. Additional implementations targeted towards specific platforms have also been created (A. Daly and W. Marnane. "Efficient architectures for implementing Montgomery modular multiplication and RSA modular exponentiation on reconfigurable logic," *Proceedings of the 2002ACM/SIGDA tenth international symposium on Field-programmable gate arrays*, Monterey, Calif., Feb. 24-26, 2002; T. Blum and C. Paar. "High-Radix Montgomery modular exponentiation on reconfigurable hardware," *IEEE Transactions on Computers*, vol. 50 no. 7, pp. 759-764, July 2001).

In prior art, these solutions can be classified into three sorts, depending on the assumed radix of basic operations. First, several solutions take the radix to be 2 (that is, bitwise operations dominate). In these solutions, the number of iterations needed to compute a result is the bit-width of the Montgomery multiplier itself. Though these solutions typically avoid carry propagation during iteration by some form of carry-redundant representation of partial results, in an application to cryptography, K(the input bit length) can be 1024 or much more. So the timing overhead of requiring K iterations is substantial. Second, several solutions assume an underlying word size (w) for which the hardware supports w×w bit multiplication. These solutions cut the number of outer iterations down to K/w. And yet, each iteration requires at least 2K/w separate multiplications because two K×w bit sub-products are computed. In some solutions, these sub-products are also handled with carry-redundant representations, but computation of the sub-products themselves requires carry propagations. Third, some solutions take the radix to be 4, using either a form of Booth multiplication to eliminate redundant additions or pre-computed sub-products. While these halve the number of iterations, they incur significant overhead in preparatory calculations.

In the solutions known in prior art, it appears that complete elimination of carry propagation during the main loop is incompatible with exploiting hardware multipliers to reduce the number of iterations needed. If the hardware multipliers are used to produce full sub-products, then carry propagation will be incurred at least during the sub-product computation. Many mid-level to upper-level Field Programmable Gate Arrays (FPGAs) support a plurality of at least eight 64×64 bit multipliers operating in parallel. Similarly, with standard design tools, Application Specific Integrated Circuits (ASICs) and custom circuit implementations can easily support parallel hardware multipliers. None of the prior art solutions are able to exploit these resources.

The standard definition of the Montgomery algorithm requires that the input multiplier and multiplicand both be in reduced form with respect to the modulus. That is, both must be less than the modulus. Likewise, in most implementations the algorithm guarantees the result is also in reduced form. This guarantee is kept by comparing n to a result that is known to be less than 2n, and subtracting n if necessary. In the context of most applications including Montgomery exponentiation, these requirements are unnecessary. Except for the final step, it suffices (for correctness) to have all intermediate values as residual representations without regard for their size. If an implementation can guarantee a bound on the bit width of intermediate values, then an expensive comparison to the modulus can be avoided. In this invention, the comparison to n is eliminated, yielding a significant area savings and speed up.

OBJECTS AND ADVANTAGES OF THE INVENTION

Accordingly, several objects and advantages of the present invention are:

(1) to provide a scalable fast method and apparatus for residual modular multiplication suitable for implementation on mid-level FPGA, ASIC and custom circuit designs;
(2) to provide a scalable fast method and apparatus for residual modular multiplication with minimal area requirements;
(3) to provide for the exploitation of hardware multipliers to reduce the number of outer iterations by a factor of w (in preferred embodiments, w=64);
(4) to avoid all carry propagation during the main loop of the algorithm;
(5) to provide for the exploitation of parallel hardware multipliers to further reduce the time needed for each main iteration;
(6) to provide a method and apparatus that is suitable for use in the Montgomery exponentiation algorithm;
(7) to extend the range of operability of residual modular multiplication to include all multipliers and multiplicands that are K bits in length;
(8) to eliminate a costly comparison to the modulus, saving several cycles per use of the invention and the area otherwise dedicated to a very large comparator;
(9) to provide an apparatus that is suited to embodiment in mid-level FGPA, ASIC or custom circuit designs.

This invention can be embodied on several fabrics, including FPGAs, ASICs, and custom circuits. Most commercial FPGAs have dedicated multipliers that can be used to perform the parallel multiplication. In ASICs, designers can build the necessary number of multiplier units to meet specific performance requirements. In custom circuits, designers can build more specific domain driven circuits to meet final product needs with trade-offs for performance versus area. In any fabric, this invention is scalable based on the available resources (such as larger multipliers, more parallel multipliers, or larger moduli).

BRIEF SUMMARY OF THE INVENTION

This invention provides a scalable method and apparatus for residual modular multiplication, also known as Montgomery multiplication, that exploits parallel multiplier units and a carry-save adder to eliminate all carry propagations in the main computation. The invention allows for pipelined operation of the carry-save unit and the multipliers, resulting in very fast embodiments with significantly smaller area requirements than competing inventions. The method and apparatus scales according to three parameters:

w—the bit width of the parallel multipliers to be used.
m—the number of parallel multipliers that are available. The size of the modulus must be evenly divisible by 2 mw. As most contemporary FGPAs provide support for several built-in parallel multipliers, the method and apparatus is well-suited to embodiment on an FPGA. Using standard design systems, the invention is also well-suited to ASIC embodiment. An additional optimization is obtained if additional multipliers are available.
k—an integer so that the size of the modulus is 2 kmw. That is, $K=2\ kmw$, $r=2^w$, $L=2\ km$, and $R=2^{Lw}$. For example, for a modulus of 1024 bits, if the underlying implementation supports 8 parallel (64×64)-bit multipliers, then $1024=2\times8\times64$. So k=1. In cases where k=1, the invented apparatus is significantly simplified compared to the general case of k>1.

DETAILED DESCRIPTION OF THE INVENTION

Figure 1:
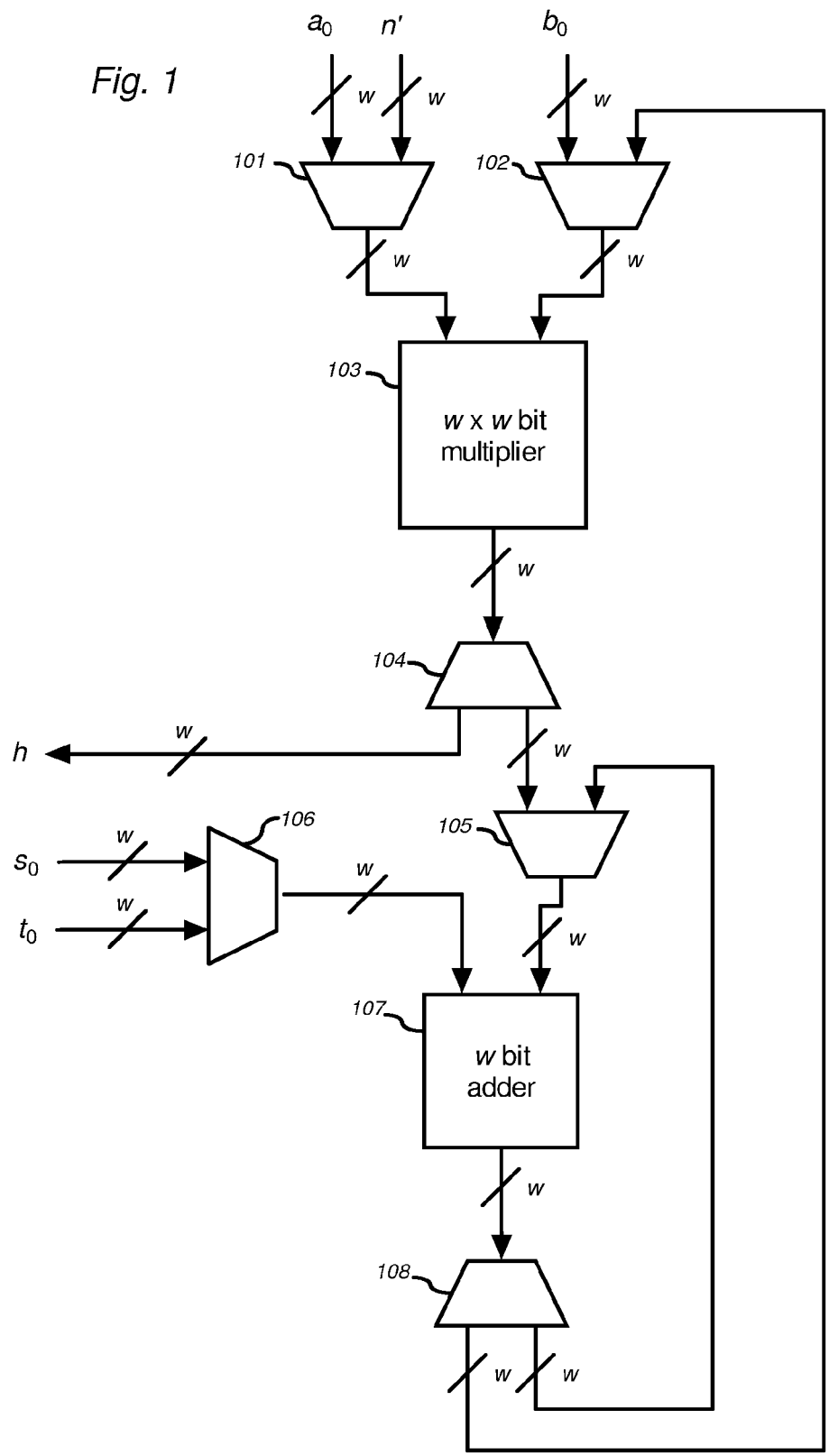
FIG. 1 shows the sub-unit that computes the value h in the embodiment of FIG. 4.

There are three main puzzles that face designers when creating hardware implementations of Montgomery multiplication. The first is the "true" multiplication operation internal to the Montgomery algorithm. Today, most mid-level FPGA boards have dedicated logic for several parallel 64×64 bit multiplications. Similarly, ASIC implementations of such multipliers are relatively automated. So, one puzzle is how to take advantage of such parallel multipliers efficiently in the context of large inputs.

The second significant puzzle is how to manage addition. Repeated addition operations are required for Montgomery multiplication, wherein the size of the addends is the strength of the encryption system. Thus, for 1024 bit RSA encryption, at least two 1024 bit additions are needed per iteration of the main loop of the algorithm, where the number of iterations depends on the radix. The carry propagation for full adders would be a significant bottleneck. Hence, the second puzzle is how to avoid carry propagation while adding such large data.

The third puzzle is how to keep area requirements at a minimum. In a straightforward implementation of Montgomery multiplication, very large and complex circuits are needed to implement the necessary additions. Even in an implementation such as the McIvor et al. that exploits carry-save adders, the device uses four separate carry-save adders. The area requirements for these adders is quite high and appears unavoidable in other devices that implement the Montgomery multiplication using similar techniques.

This invention deals with these three puzzles together by factoring the computation of sub-products into four parts and the computation of an accumulated sum into four carry-save additions. The specific choice of sub-products avoids carries completely and allows the invention to exploit parallel multipliers, while the novel use of carry-save adders does not propagate any carries. Furthermore, because the two main sub-computations (product and carry-save addition) are factored this way, the device can exploit a pipeline to compute these in parallel, thus allowing a single carry-save adder to be reused for all four additions.

The carry-save adder and multipliers are operated in four phases per each word of the input a, i.e., in L iterations and are configured to avoid all carry-propagation during these iterations. At the end of computation, a partial sum and partial carry are added to generate an approximate result. Finally, if needed a final addition is carried out to correct the approximate result. Hence, the costly carry propagation of full adders is completely eliminated from the main loop of the algorithm and is incurred at most twice per use of the invention. Moreover, the potential second full addition is only needed in case the first addition results in a carry out, not as a result of an expensive comparison to n.

The Basic Montgomery Algorithm and Preliminary Mathematics

In order to understand the present invention, it is helpful to fix notation and terminology and to review the fundamental idea of the Montgomery algorithm.

Throughout this document, we write $x \equiv_y z$ to indicate that the natural numbers x and z are congruent modulo the natural number y. That is, x−z is an integer multiple of y. We also write x % y to denote the remainder of division x/y.

The residual modular multiplication depends on a predetermined natural number R, referred to as the residual. Given a modulus n, a multiplier a, and a multiplicand b, residual modular multiplication seeks a value u with the property $u \cdot R \equiv_n a \cdot b$. To ensure that a·b can be uniquely recovered (up to congruence) from u, the modulus and residual must be relatively prime. In most applications, the modulus is assumed to be odd, so a residual that is a power of two guarantees this basic property. In the basic Montgomery algorithm, a, b, and u are further required to be less than the modulus n, and the modulus is required to be less than the residual.

Residual modular multiplication can be used to produce the true modular product of two values. Specifically, let x⊗y denote the result of residual modular multiplication. That is (x⊗y)·R is congruent to x·y. Then (x⊗y)⊗$R^2$ is congruent to x·y. Hence two uses of residual modular multiplication (with pre-computed value $R^2$) yields standard (non-residual) modular multiplication. This, nevertheless, still eliminates division, so it can be faster than a more direct computation. On the other hand, more complicated modular computations such as exponentiation can be implemented directly on residual representations, thus saving a significant number of divisions. A typical exponentiation algorithm, implemented using a modified "square-and-multiply" algorithm, is discussed below.

Given residual R and modulus n, Euclid's algorithm can be used to produce a value n' such that $n \cdot n'+1 \equiv_R 0$. Now setting u'=a·b+(a·b·n'% R)n, the result is clearly congruent to a·b modulo n, and also congruent to 0 modulo R. So setting u=u'/R results in a value so that u·R is congruent to a·b modulo n. All that remains is to note that $u' < n^2 + R \cdot n$, so u<2n. Thus one further subtraction of n may be needed to produce the desired value.

The basic Montgomery algorithm extends to larger moduli and larger multipliers and multiplicands by representing these inputs in radix r and taking the residual R to be a power of r. This is natural because (i) R is a predetermined value and (ii) R itself is typically taken to be a very large power of two, so that radix r representation simply means that the inputs are represented as arrays of words.

Let us assume that a, b, and n are represented as L digit radix r values. We allow for leading 0's in these representations as needed. Thus, in the above description, $R = r^L$. To be explicit, a is given to us in L values $a_0, a_1, \ldots, a_{L-1}$ so that $$a = a_0 + a_1 \cdot r + a_2 \cdot r^2 + \ldots + a_{L-1} \cdot r^{L-1}.$$

The values b and n are given similarly. To make the following notation simpler, for $0 \le j \le i \le L$, we define $a(i,j) = a_j \cdot r^j + a_{j+1} \cdot r^{j+1} + a_{j+2} \cdot r^{j+2} + \ldots + a_{i-1} \cdot r^{i-1}$. In particular, a(L,0)=a and, as one expects, a(i,i)=0.

The basic algorithm adapts to radix r by computing at each stage i, a value u<2n such that $$u \cdot r^i \equiv_n a(i,0) \cdot b. \quad (1)$$

When i=L, $r^i = R$ and a(i,0)=a. So after L iterations and after adjusting to ensure u<R, u is the desired result.

For this algorithm, we need a value n' so that $n \cdot n'+1 \equiv_R 0$ and n'<r. The value of n' depends only on the least significant word of n and can be computed easily using Euclid's algorithm.

Now, suppose that u satisfies (1). Let $h = (u_0 + a_i \cdot b_0) \cdot n' \% r$. By our choice of n', $$u + a_i \cdot b + h \cdot n \equiv_r 0 \quad (2)$$

$$u + a_i \cdot b + h \cdot n \equiv_n u + a_i \cdot b \quad (3)$$

must hold. Hence setting u'=u+$a_i$·b+h·n, we have $u' \cdot r^i \equiv_n u \cdot r^i + a_i \cdot b \cdot r^i$. The later is equal to a(i+1,0) by the assumption, so u'/r is the desired value. This multi-word version of Montgomery's algorithm is summarized as follows:

u=0;
for i=0 to L−1:

$$h = (u_0 + a_i b) \cdot n' \% r;$$

$$u' = u + a_i \cdot b + h \cdot n;$$

$$u = u'/r$$

if u>n, u=u−n
return n

DETAILED DESCRIPTION OF THE INVENTION: CARRY-SAVE OPTIMIZATIONS

To avoid carry propagation in the above algorithm, this invention uses carry-redundant representations and carry-save adders. That is, for three values x, y, and z and a carry-in c, a carry-redundant representation is a pair of values s and t so that s+t=x+y+z+c. A carry-save adder is a device that produces a carry-redundant representation from these four inputs. Typically a carry-save adder is embodied as an array of K parallel one bit full adders, wherein adder number i has inputs $x_i$, $y_i$, and $z_i$ and has the sum output to $s_i$ and carry output to $t_{i+1}$ and by setting $t_0 = c$. Other embodiments of carry-save adders are possible for use in this invention, and are considered equivalent for the purposes of this invention, provided the above invariant is maintained. Note that in general, the value t will be one bit longer than s, but under many assumptions about the three main inputs, a carry-save adder may actually be guaranteed not to generate a 1 in the most significant bit of t.

This invention uses some number theoretic facts about the multi-word algorithm to simplify the use of a carry-save adder, and to use parallel w×w multiplication to exploit the resources available on most FPGAs, ASICs or custom circuits.

Figure 2:
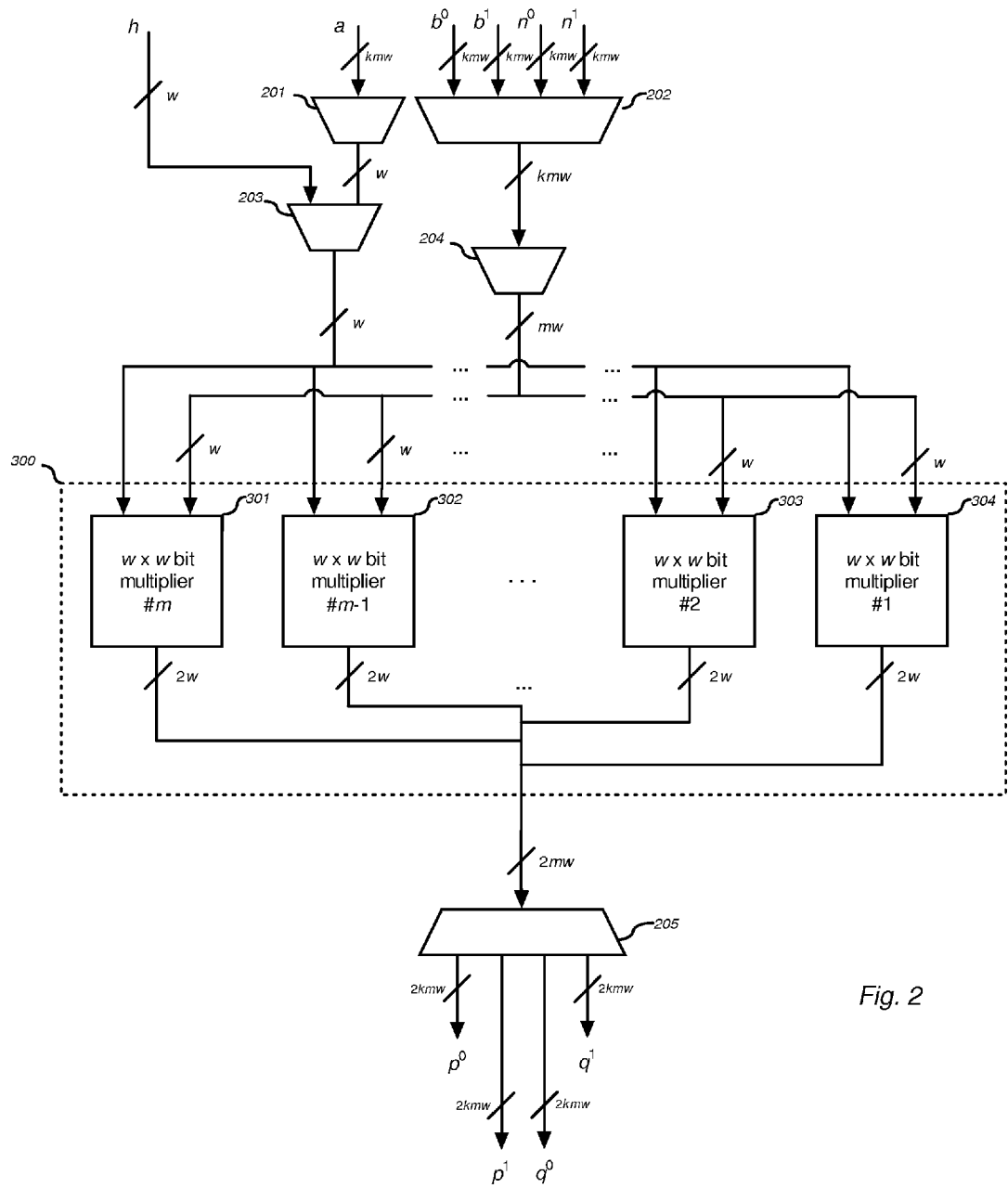
FIG. 2 shows the sub-unit that computes partial sub-products in the embodiment of FIG. 4.
Figure 3A:
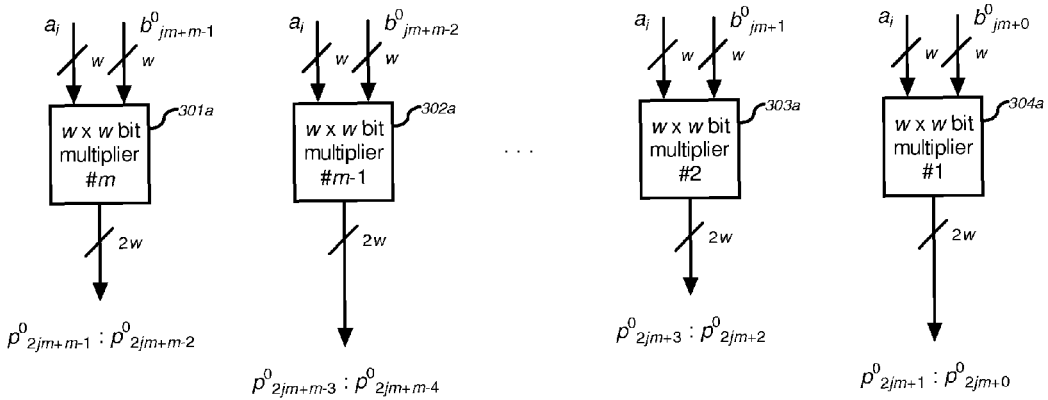
FIGS. 3*a*, 3*b*, 3*c*, and 3*d* show the details of word routing to multipliers in FIG. 2.
Figure 3B:
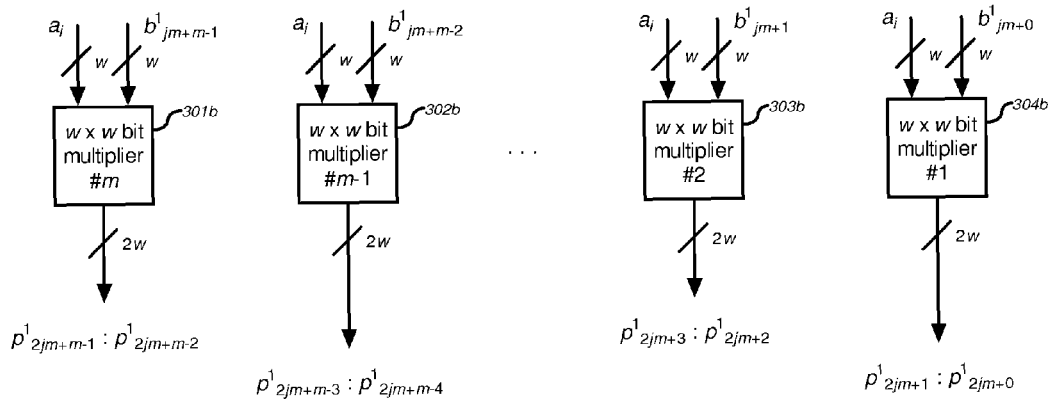
Figure 3C:
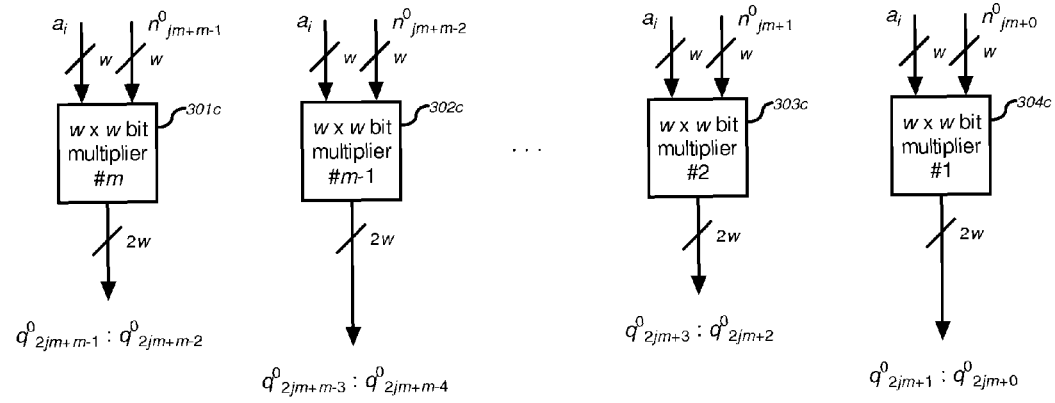
Figure 3D:
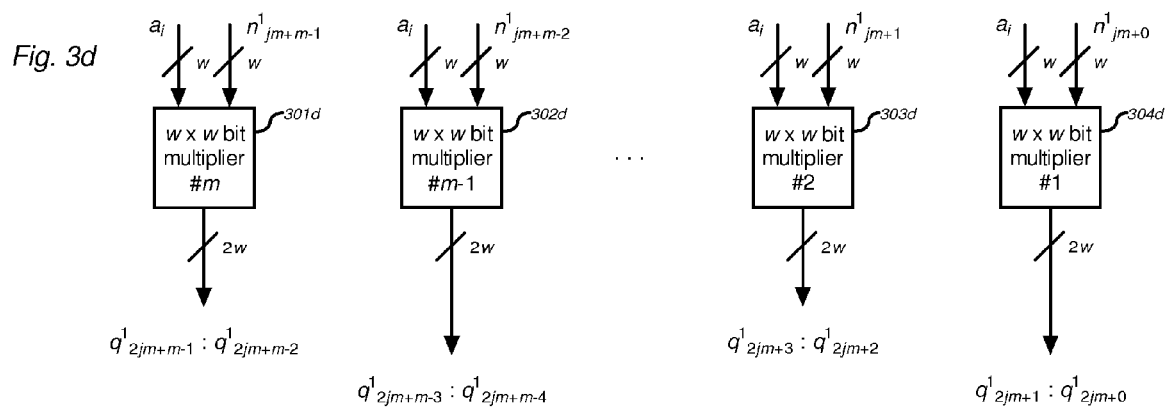

The idea is to adapt the invariant of the basic algorithm of FIG. 2 so that at each stage, the following conditions hold:

$$(s+t) r^i \equiv_n a(i,0) \cdot b$$

$$s < R$$

$$s + t < R + n$$

Suppose we are given s, t, and i satisfying the above conditions. Then let $h = (s_0 + t_0 + a_i \cdot b_0) n' \% r$. Then the same reasoning applies as in the basic multi-word algorithm. That is, $$s + t + a_i \cdot b + h \cdot n \equiv_r 0 \quad (4)$$

$$s + t + a_i \cdot b + h \cdot n \equiv_n u + a_i \cdot b \quad (5)$$

Two carry-save adders can be used to compute s' and t' as a carry-redundant representation of the sum $s+t+a_i \cdot b+h \cdot n$, avoiding carry propagation. Thus, $(s'+t')$ is evenly divisible by r. Notice that the least significant digit of s' is therefore zero if and only if the least significant digit of t' is zero. If this is the case, then $(s'+t')/r=s'/r+t'/r$. Otherwise, $(s'+t')/r=\lfloor s'/r \rfloor + \lfloor t'/r \rfloor + 1$.

If we compute the two products $a_i \cdot b$ and $h \cdot n$ in the obvious way, they will also incur carry propagation. Take $h \cdot n$ as an example, the result should be $h \cdot n_0 + h \cdot n_1 \cdot r + h \cdot n_2 \cdot r^2 + \ldots + h \cdot n_{L-1} \cdot r^{L-1}$, but because each sub-product is two words long, this involves carries.

On the other hand, if L is even we can put $h \cdot n$ in a form suitable for carry-save manipulation by defining $$q^0 = h \cdot n_0 + h \cdot n_2 \cdot r^2 + h \cdot n_4 \cdot r^4 + h \cdot n_{L-2} \cdot r^{L-2}$$

$$q^1 = h \cdot n_1 + h \cdot n_3 \cdot r^2 + h \cdot n_5 \cdot r^4 + h \cdot n_{L-1} \cdot r^{L-2}$$

So $h \cdot n = q^0 + q^1 \cdot r$. None of the sub-products in these sums overlap, so no carries are involved. The sub-products can be computed in parallel within the capability of specific hardware resources. We define $p^0$ and $p^1$ similarly for the product $a_i b$. Thus, $$s+t+p^0+p^1 \cdot r + q^0 + q^1 \cdot r \equiv_r 0 \quad (6)$$

$$s+t+p^0+p^1 \cdot r + q^0 + q^1 \cdot r \equiv_n u + a_i \cdot b \quad (7)$$

Notice that the terms $p^1 \cdot r$ and $q^1 \cdot r$ can be omitted from equation (4) because each is congruent to 0 modulo r.

Order of Evaluation

The sum $s+t+p^0+p^1 \cdot r + q^0 + q^1 \cdot r$ can, in principle, be implemented in any of twenty-four orderings of the four partial sub-products. All of these orderings result in alternative embodiments of the invention. However, because the values $q^0$ and $q^1$ depend on $h=(s_0+t_0+p^0_0) \cdot n\% \; r$, the preferred embodiments stage computations so that $p^0$ is obtained first, so that the least significant word can then be used to compute the value h. This leaves six possible orderings of the above sum. Of these, two are preferred:

$$(((s+t+p^0)+p^1 \cdot r)+q^0)+q^1 \cdot r \quad (8)$$

$$(((s+t+p^0)+q^1)+p^1 \cdot r)+q^1 \cdot r \quad (9)$$

The advantage of (8) is that computation of m can be implemented in parallel with computation of $p^1 \cdot r$ and its addition. This can reduce latency if the actual number of available hardware multipliers is m+1. The disadvantage is that $p^1 \cdot r$ is 2 km+1 words long. So the carry-save adder must be larger. The advantage of (9) is that both of the values $p^1 \cdot r$ and $q^1 \cdot r$ can be added after dividing by r. This keeps the size of the carry-save adder as small as possible. The disadvantage is that computation of h must occur prior to $q^0$ and after the least significant word of $p^0$.

In both orderings, once $q^0$ is added (via a carry-save adder) the result is a carry-redundant representation that is equivalent to the full sum modulo r. At that point, the carry-redundant form may be shifted down by one word (that is, divided by r). To describe the methods determined by (8) and (9), we use the following notation:

| Definition List 1 | |
|---|---|
| Term | Definition |
| s, t = CSA(x, y, z, c) | (s, t) is a carry-redundant representation of the sum x + y + z + c |

| -continued | |
|---|---|
| Definition List 1 | |
| Term | Definition |
| p = PMU(x, y) | p is the 2 kmw bit result of multiplying the w bit value x by each w bit word of the km word value y |
| h = HU(x, y, z, v) | h is the result of taking the least significant word of $(x + y + z) \cdot v$ |
| x >> w | x is shifted down by w bits and padded with leading zeros. |
| x << w | x is shifted up by w bits with least significant w bits filled with zeros. |
| $x_0 \neq 0$ | Single bit result of comparing least significant word of x to 0. |
| msb(x) | Most significant bit of x |
| x[i:j] | Bits indexed i, i − 1, i − 2, . . . , j |

The first ordering (8) leads to a method of computation involving intermediate values s, t, p, h and u having the following bit-widths:

| Value | Bit Width |
|---|---|
| s | (2 km + 1)w |
| t | (2 km + 1)w + 1 |
| p | 2 kmw |
| h | w |
| u | 2 kmw + 1 |

This yields the following method:
s=0; t=0; p=0
for i in the range 0 to 2 km−1, operate in four phases:
[Phase A]

$s, t = CSA(s >> w, t >> w, p, s_0 \neq 0)$;

$p = PMU(a[iw+w-1:iw], b^0)$;

[Phase B]

$h = HU(s[w-1:0], t[w-1:0], p[w-1:0], n')$ $s, t = CSA(s, t, p, 0)$ $p = PMU(a[iw+w-1:iw], b^1)$

[Phase C]

$s, t = CSA(s, t, p << w, 0)$ $p = PMU(h, n^0)$

[Phase D]

$s, t = CSA(s, t, p, 0)$ $p = PMU(h, n^1)$ $s, t = CSA(s >> w, t >> w, p, s_0 \neq 0)$;

$u = s + t$ if msb(t) or msb(u): $u = u + (-n)$
return u

The second ordering (9) leads to a method of computation involving intermediate values s, t, p, h and u having the following bit-widths:

| Value | Bit Width |
|---|---|
| s | 2 kmw |
| t | 2 kmw + 1 |
| p | 2 kmw |
| h | w |
| u | 2 kmw + 1 |

This yields the following method:

$s=0; t=0; p=0$ for i in the range 0 to 2 km−1, operate in five phases:

[Phase A]

$s, t=CSA(s, t, p, 0);$ $p=PMU(a[iw+w-1:iw],b^0);$

[Phase A1]

$h=HU(s[w-1:0],t[w-1:0],p[w-1:0],n')$

[Phase B]

$s, t=CSA(s, t, p, 0)$ $p=PMU(h,n^0)$

[Phase C]

$s, t=CSA(s, t, p, 0)$ $p=PMU(a[iw+w-1:iw],b^1)$

[Phase D]

$s, t=CSA(s>>w, t>>w, p, s_0\neq 0)$ $p=PMU(h,n^1)$ $s, t=CSA(s, t, p, 0);$ $u=s+t$ if msb(t) or msb(u): $u=u+(-n)$
return u FIGS. 1, 2, 3a, 3b, 3c, 3d, and 4—Non-pipeline Embodiment Orderings (8) and (9) lead to embodiments in which the carry-save logic is duplicated, and not pipelined. Although the preferred embodiments to follow save area by re-using the carry-save logic, we include a non-pipeline embodiment based on ordering (9) to illustrate an alternative to pipelining. FIG. 1 shows details of the sub-unit (100) for calculating the value h. It operates as follows

[Phase 1]
signal multiplexer (101) to send input labeled $a_0$ to multiplier (103), signal multiplexer (102) to send input labeled $b_0$ to multiplier (103), signal demultiplexer (104) to send output to multiplexer (105),
signal multiplier (103) to compute;

[Phase 2]
signal multiplexer (106) to send input labeled $s_0$ to adder (107), signal multiplexer (105) to send input from demultiplexer (104) to full adder (107), signal demultiplexer (108) to send output to multiplexer (105),
signal adder (107) to compute;

[Phase 3]
signal multiplexer to send input labeled $t_0$ adder (107), signal multiplexer (105) to send input from demultiplexer (108) to adder (107), signal demultiplexer to send output to multiplexer (102),
signal adder (107) to compute;

[Phase 4]
signal multiplexer (101) to send input labeled n' to multiplier (103), signal multiplexer (102) to send input from demultiplexer (108) to multiplier (103), signal demultiplexer (104) to send output to line output of the unit (h).

FIG. 2 illustrates computation of the four partial sub-products $p^0$, $p^1$, $q^0$ and $q^1$. This device operates in 4 k phases, A0, B0, C0, D0, A1, B1, C1, D2, etc., as follows:

[Phase Aj]
signal multiplexer (201) to send input from $a_i$ to multiplexer (203), signal multiplexer (203) to send input from multiplexer (201) to multipliers (300), signal multiplexer (202) to send input from $b^0$ to multiplexer (204), signal multiplexer (204) to send input $b^0_j$, signal demultiplexer to send output to $p^0_{2j+1}$:$p^0_{2j}$,
signal multipliers (301, . . . ) to compute;

[Phase Bj]
signal multiplexer (201) to send input from $a_i$ to multiplexer (203), signal multiplexer (203) to send input from multiplexer (201) to multipliers (300), signal multiplexer (202) to send input from $b^1$ to multiplexer (204), signal multiplexer (204) to send input $b^1_j$, signal demultiplexer to send output to $p^1_{2j+1}$:$p^1_{2j}$,
signal multipliers (301, . . . ) to compute;

[Phase Cj]
signal multiplexer (203) to send input from input labeled h to multipliers (300), signal multiplexer (202) to send input from $n^0$ to multiplexer (204), signal multiplexer (204) to send input $n^0_j$, signal demultiplexer to send output to $q^0_{2j+1}$:$q^0_{2j}$,
signal multipliers (301, . . . ) to compute;

[Phase Dj]
signal multiplexer (203) to send input from input labeled h to multipliers (300), signal multiplexer (202) to send input from $n^1$ to multiplexer (204), signal multiplexer (204) to send input $n^1_j$, signal demultiplexer to send output to $q^1_{2j+1}$:$q^1_{2j}$,
signal multipliers (301, . . . ) to compute.

Figure 4:
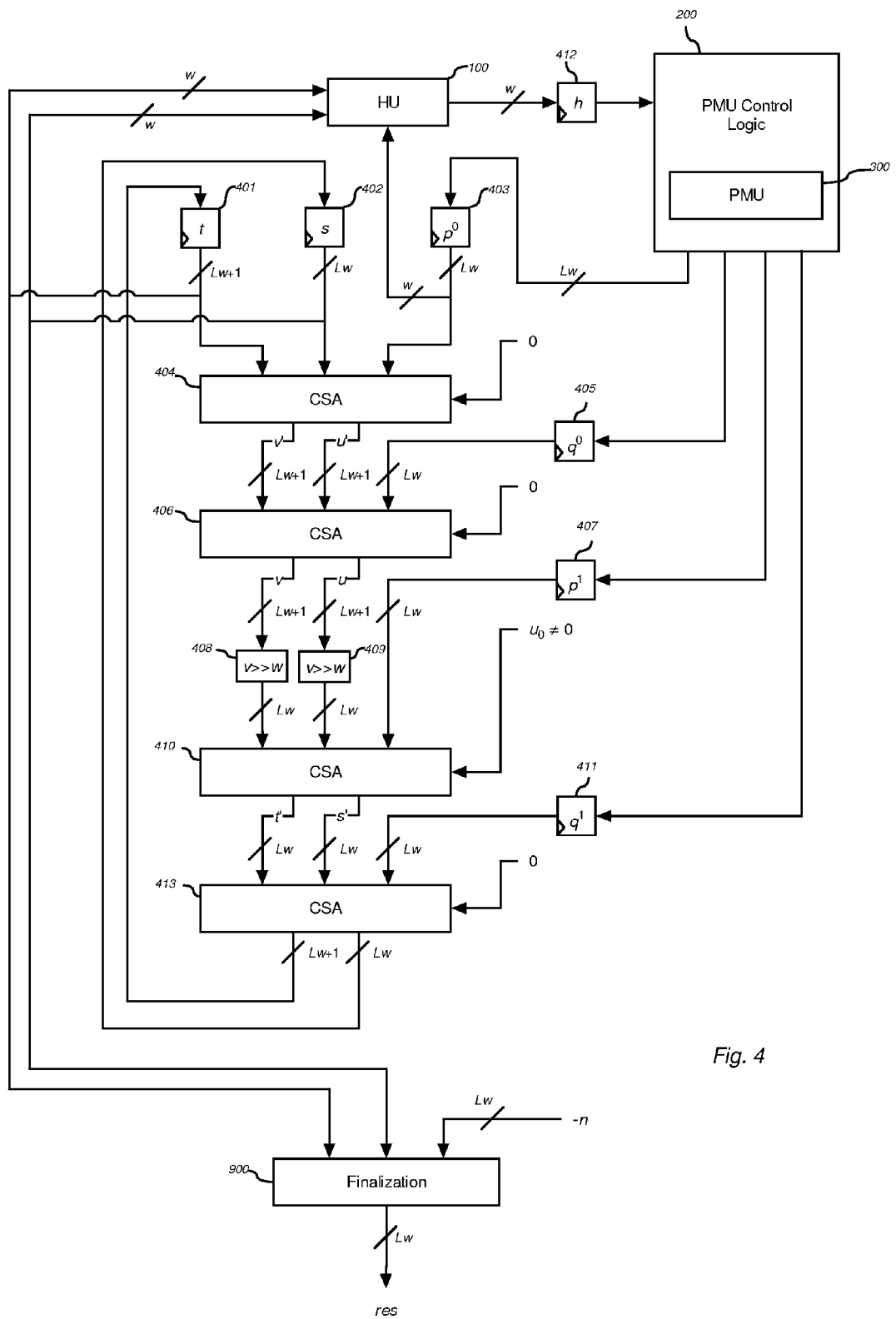
FIG. 4 shows a non-pipelined embodiment of the invention.

FIG. 3 illustrates in more detail the routing of words to multipliers in FIG. 2. FIG. 4 shows the overall configuration for the non-pipeline embodiment implementing ordering (9).

In this non-pipeline embodiment, four carry-save adders are configured in a cascade as detailed in FIG. 4. This operates as follows:

reset registers s, t, p
for i in the range 0 to 2 km, operate:
signal to HU (100) to compute, storing result in register h (412),
signal to the PMU Control Logic (200) to compute values $p^0$, $p^1$, $q^0$ and $q^1$, storing results in registers (403), (405), (407) and (411), respectively,
signal CSA units (404), (406), (410) and (412) to compute in sequence, storing result in registers (401) and (402),
signal Finalization unit (1000) to compute, sending result to output of the device.

Figure 5:
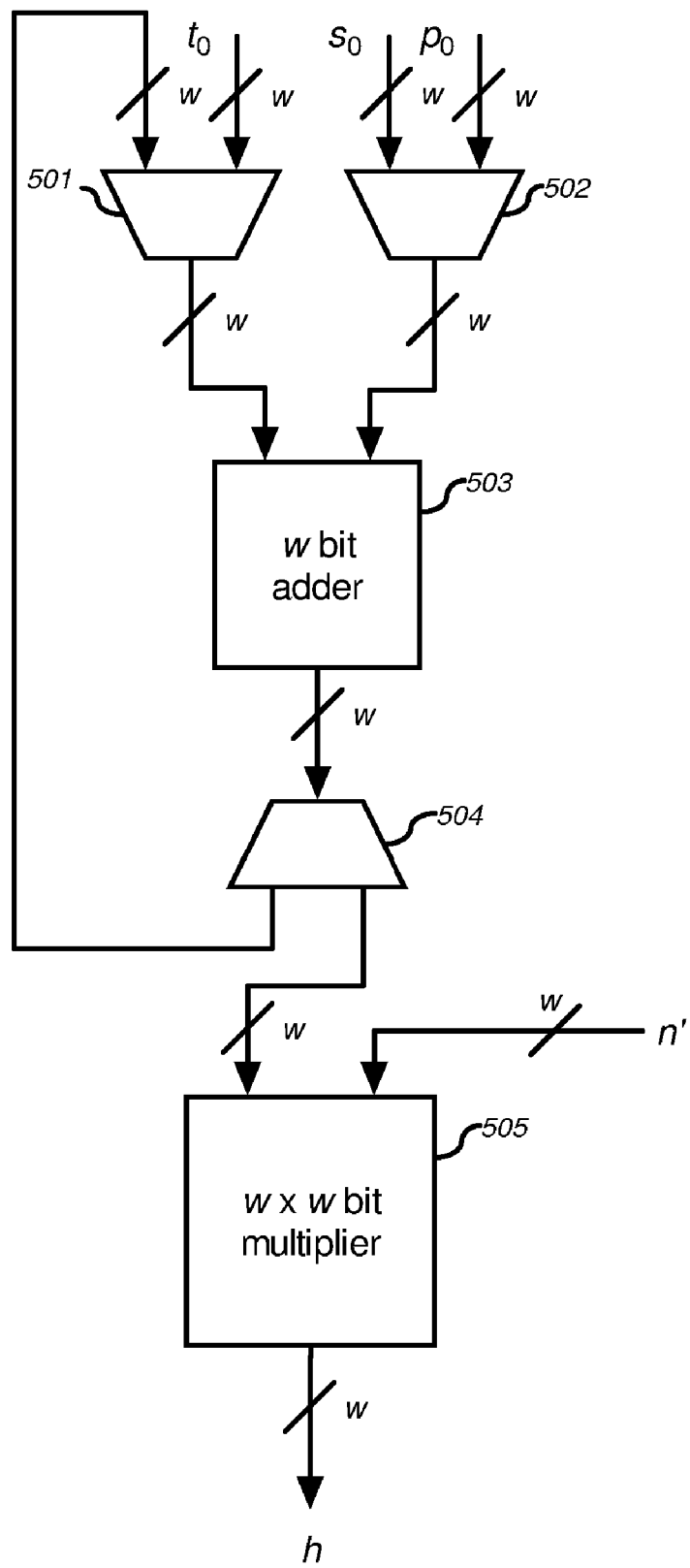
FIG. 5 shows the sub-unit that computes the value h in the embodiments of FIGS. 8 and 9.

FIG. 5—HU for Preferred Embodiments

Figure 8:
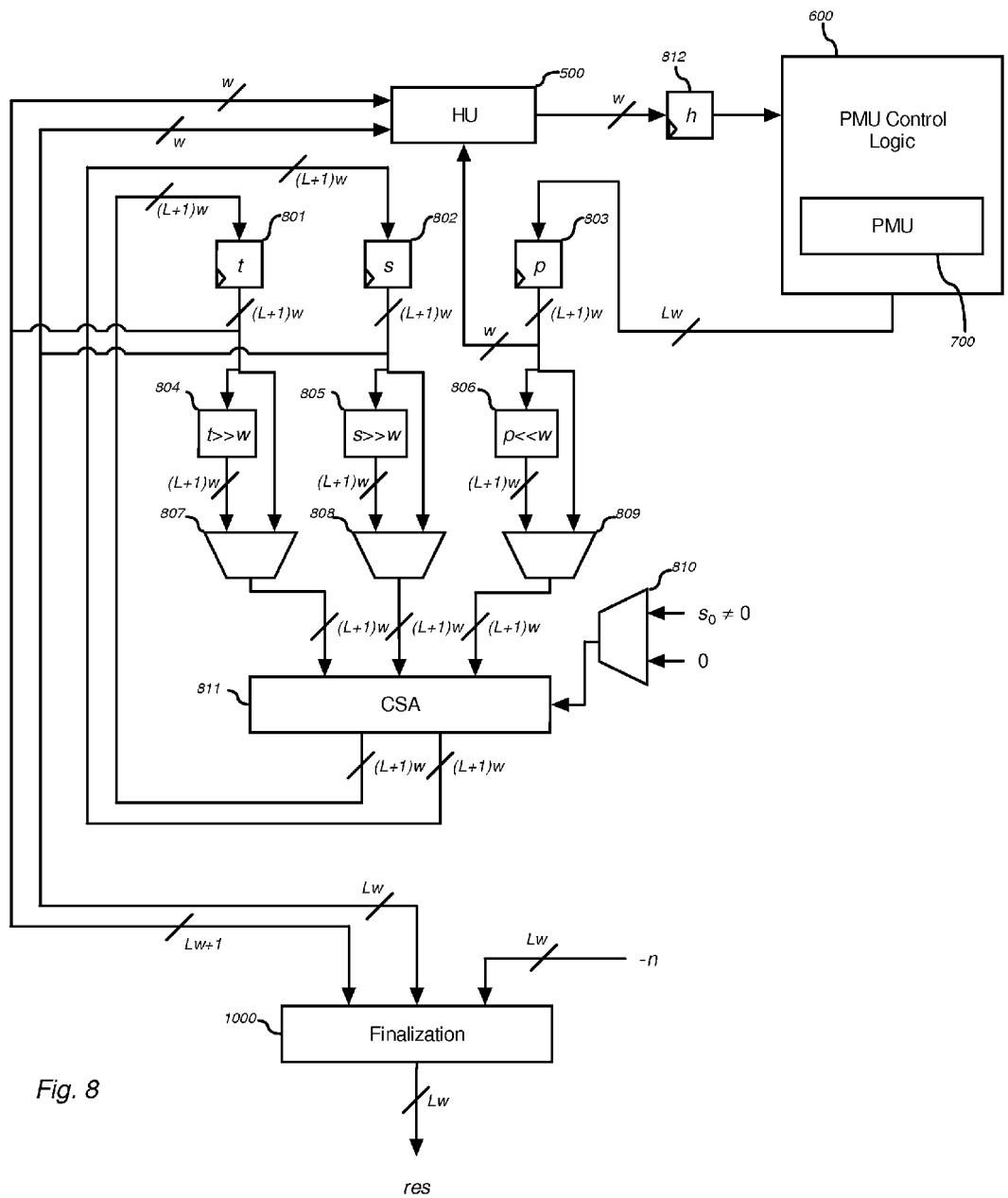
FIG. 8 shows the first preferred embodiment.
Figure 9:
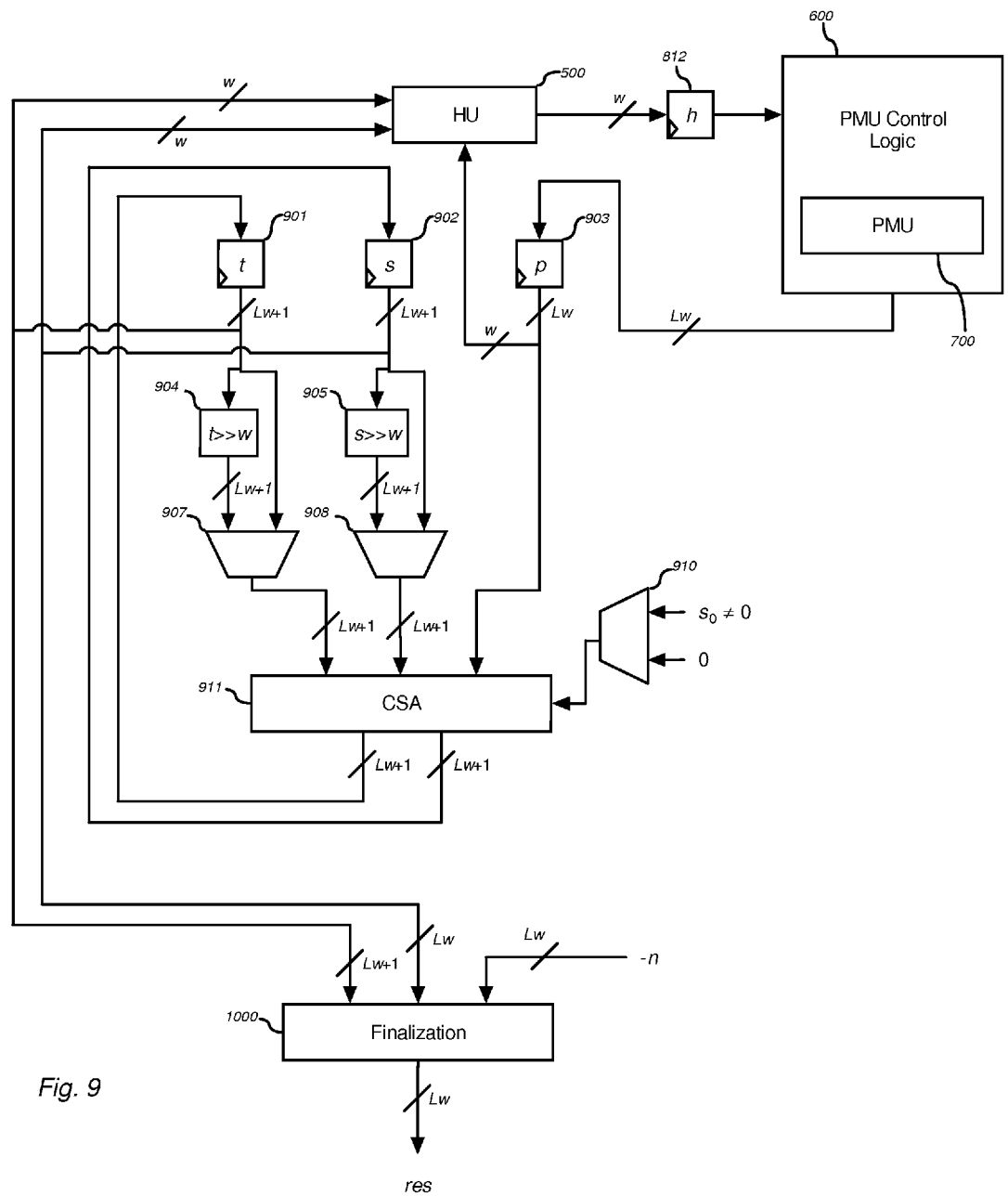
FIG. 9 shows the second preferred embodiment.

During operation, the embodiments of FIGS. 8 and 9 require calculation of a value h, computation of which can be embodied as a separate unit (HU) or by any other functionally equivalent means. In FIG. 5, a preferred embodiment of the HU operates as follows:

[Phase 1]
signal multiplexer (501) to send input labeled $t_0$ full adder (503), signal multiplexer (502) to send input labeled $s_0$ to full adder (503), signal demultiplexer (504) to send output of full adder (503) to multiplexer (501);
signal full adder (503) to compute;

[Phase 2]
signal multiplexer (501) to send input from demultiplexer (504) to full adder (503), signal multiplexer (502) to send input labeled $p^0$ to full adder (503), signal demultiplexer (504) to send output of full adder (503) to multiplier (505);
signal full adder to compute;

[Phase 3]
signal multiplier (505) to compute, recording the lower w bits of the result to output (h) of the unit.

This embodiment of HU re-uses a single w-bit full adder. Other functionally equivalent embodiments may employ two adders in a cascaded configuration.

Figure 6:
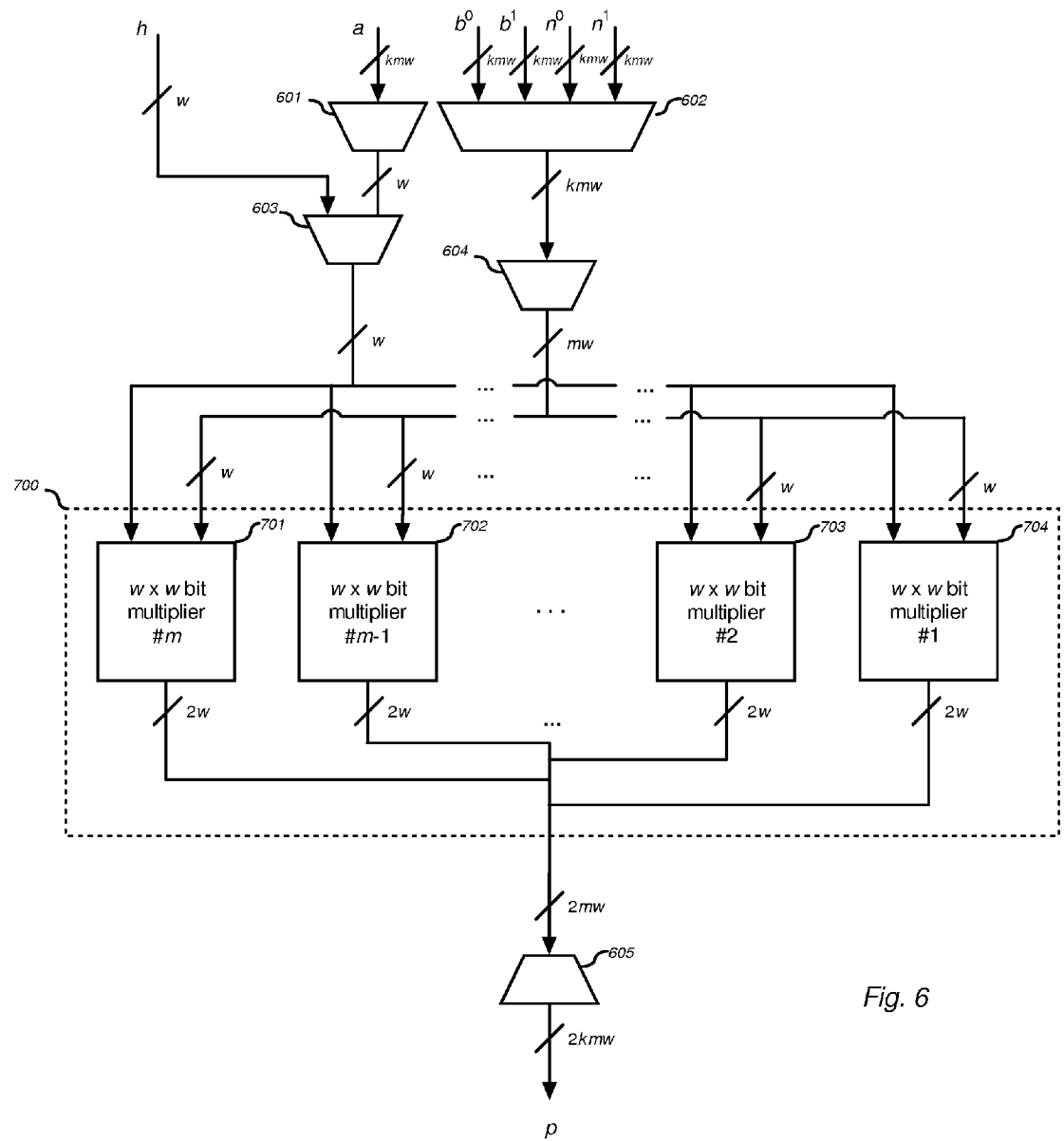
FIG. 6 shows the sub-unit that computes the partial sub-products in the embodiments of FIGS. 8 and 9.
Figure 7A:
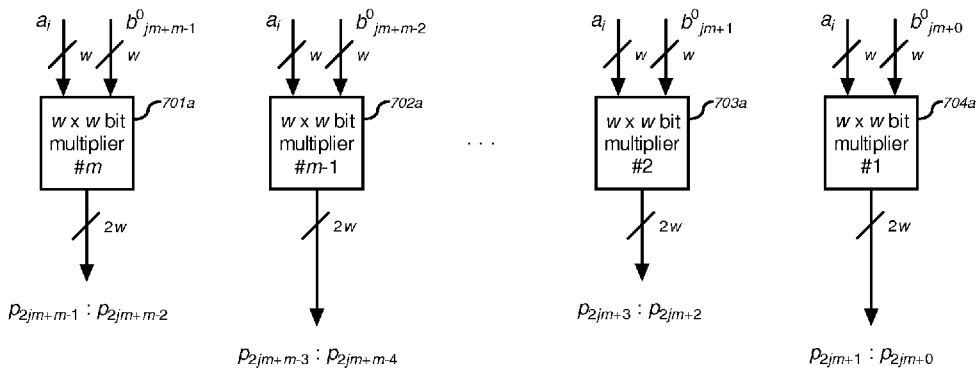
FIGS. 7*a*, 7*b*, 7*c*, and 7*d* show details of the word routing to multipliers in FIG. 6.
Figure 7B:
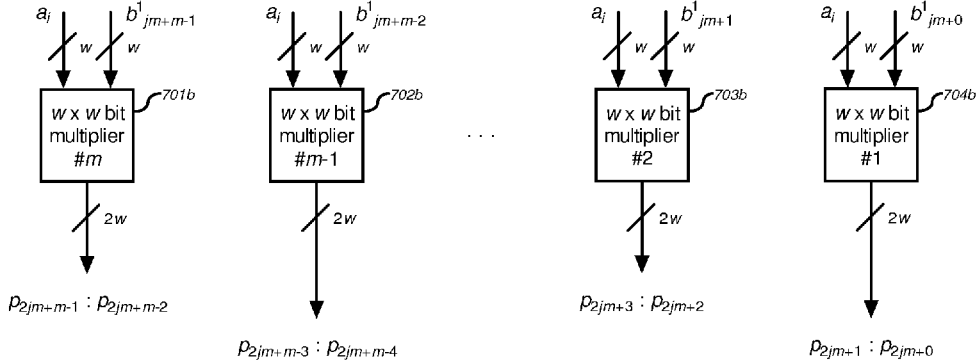
Figure 7C:
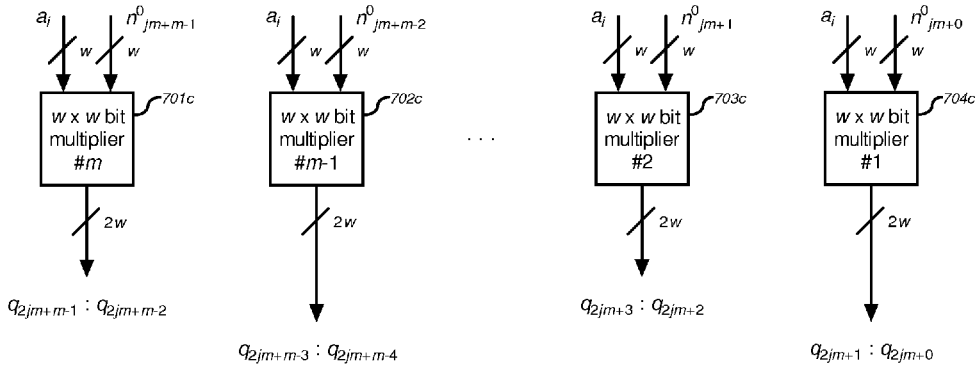
Figure 7D:
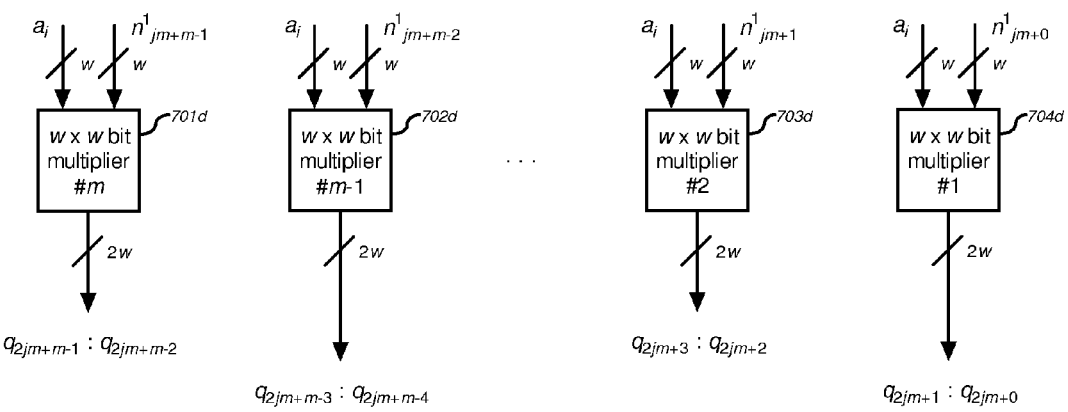

FIGS. 6, 7a, 7b, 7c, and 7d—Plural Multiplier Unit for Preferred Embodiments Preferred embodiments of FIGS. 8 and 9 comprise a plural multiplier unit, which is a sub-system that computes the partial sub-products $p^0$, $p^1$, $q^0$ and $q^1$. This sub-system can be embodied as a distinct sub-apparatus or any other functionally equivalent means. The plural multiplier unit assumes a predetermined plurality of m hardware multipliers capable of calculating a w×w bit product, where the radix r is $2^w$ for a predetermined word size w. As noted earlier, we also assume that the bit width is K=2 kmw for some predetermined value of k. Thus, L=2 km and the radix is $2^w$. In this way, the number of w×w bit products that comprise the value $p^0$ (as well as the others) is km=L/2. The multiplier unit selects either $a_i$ or has a w bit multiplicand. The other multiplicand is selected from either $b^0$, $b^1$, $n^0$, or $n^1$ as kmw bits. Hence, these kmw bits grouped into k blocks of m words each, and are handled in k iterations consecutively. For example, in the case of $b^0$, in the j-th iteration multiplier m receives $b^0_{jm+m-1}$, multiplier m-1 receives $b^0_{jm+m-2}$, . . . , multiplier 2 receives $b^0_{jm+1}$, and multiplier 1 receives $b^0_{jm}$. The products of such multiplications are 2 w bits in length each and are grouped together and assigned to the register pas a single L word value. For example, following the above case of $b^0$, the corresponding storage locations in p would be $p_{L-1}:p_{L-2}$ for multiplier m, $p_{L-3}:p_{L-4}$ for multiplier m-1, . . . , $p_3:p_2$ for multiplier 2, and $p_1:p_0$ for multiplier 1. FIG. 6 shows the circuit diagram for this process. The preferred embodiment iterates through k groupings of m words each selecting one group at a time via multiplexer (604). Thus at each iteration, the bit locations advance by mw bits. The results of the multiplications are then sent to the appropriate 2 m words of the output via demultiplexer (605). FIGS. 7a, 7b, 7c and 7d provide details of the sources and destination of words in this unit. As can be seen, when k>1, the multiplication required completes in k cycles. When k=1, all of the multiplications are performed in one cycle, so the multiplexer (604) and demultiplexer (605) can be eliminated.

FIG. 8—First Preferred Embodiment

The ordering (8) leads to an embodiment of the apparatus of this invention that is shown in FIG. 8. In this embodiment, the apparatus operates as follows:
reset registers s, t, p
for i in the range 0 to 2 km, operate in four phases:

[Phase A]
signal multiplexer (807) to send input from shifted register t (804) to CSA (811), signal multiplexer (808) to send input from shifted register s (805) to CSA (711), signal multiplexer (809) to send input from register p (803) to CSA (811), signal multiplexer (810) to send signal from result of the comparison $s_0 \neq 0$ to CSA (811), signal multiplexer (601) in PMU Control Logic (600) to send input from $a_i$ to multiplexer (603), signal multiplexer (603) to send input from multiplexer (601) to PMU (700) and signal multiplexer (604) to send input from $b_0$ to PMU (700);
signal CSA (711), PMU (700) and HU (500) to compute, storing results in registers t (801), s (802), p (803) and h (812).

[Phase B]
signal multiplexer (807) to send input from register t (804) to CSA (811), signal multiplexer (808) to send input from register s (805) to CSA (811), signal multiplexer (809) to send input from register p (803) to CSA (811), signal multiplexer (810) to send 0 to CSA (811), signal multiplexer (601) in PMU Control Logic (600) to send input from $a_i$ to multiplexer (603), signal multiplexer (603) to send input from multiplexer (601) to PMU (700) and signal multiplexer (604) to send input from $b^1$ to PMU (700);
signal CSA (711) and PMU (700) to compute, storing results in registers t (801), s (802) and p (803).

[Phase C]
signal multiplexer (807) to send input from register t (801) to CSA (811), signal multiplexer (808) to send input from register s (802) to CSA (811), signal multiplexer (809) to send input from shifted register p (803) to CSA (811), signal multiplexer (603) to send input from register h (812) to PMU (700) and signal multiplexer (602) to send input from $n^0$ to PMU (700);
signal CSA (711) and PMU (700) to compute, storing results in registers t (801), s (802) and p (803).

[Phase D]
signal multiplexer (807) to send input from register t (801) to CSA (811), signal multiplexer (808) to send input from register s (802) to CSA (811), signal multiplexer (809) to send input from register p (803) to CSA (711), signal multiplexer (603) to send input from register h (812) to PMU (700) and signal multiplexer (602) to send input from $n^1$ to PMU (700);
signal CSA (711) and PMU (700) to compute, storing results in registers t (801), s (802) and p (803).
signal multiplexer (807) to send input from shifted register t (804) to CSA (811), signal multiplexer (808) to send input from shifted register s (805) to CSA (811);
signal CSA (811) to compute, storing results in registers t (801) and s (802);
signal Finalization unit (1000) to compute, sending result to output of the device.

FIG. 9—Second Preferred Embodiment

The ordering (9) leads to an embodiment of the apparatus of this invention that is shown in FIG. 9. In this embodiment, the apparatus operates as follows:
reset registers s, t, p
for i in the range 0 to 2 km, operate in five phases:
[Phase A]
signal multiplexer (907) to send input from register t (901) to CSA (911), signal multiplexer (908) to send input from register s (902) to CSA (911), signal multiplexer (910) to send 0 to CSA (911), signal multiplexer (601) to send input from $a_i$ to multiplexer (603), signal multiplexer (603) to send input from multiplexer (601) to PMU (700) and signal multiplexer (602) to send input from $b^0$ to PMU (700);

signal CSA (911), PMU (700) to compute, storing results in registers t (901), s (902), p (903) and h (912);

[Phase A1]

signal HU (500) to compute, storing result in register h (912);

[Phase B]

signal multiplexer (907) to send input from register t (904) to CSA (911), signal multiplexer (908) to send input from register s (905) to CSA (911), signal multiplexer (910) to send 0 to CSA (911), signal multiplexer (603) to send input from register h to PMU (700) and signal multiplexer (604) to send input from $n^0$ to PMU (700);

signal CSA (911) and PMU (700) to compute, storing results in registers t (901), s (902) and p (903);

[Phase C]

signal multiplexer (907) to send input from register t (901) to CSA (911), signal multiplexer (908) to send input from register s (902) to CSA (911), signal multiplexer (910) to send 0 to CSA (911), signal multiplexer (601) to send input from $a_i$ to multiplexer (603), signal multiplexer (603) to send input from multiplexer (601) to PMU (700) and signal multiplexer (602) to send input from $b^1$ to PMU (700);

signal CSA (911) and PMU (700) to compute, storing results in registers t (901), s (902) and p (903);

[Phase D]

signal multiplexer (907) to send input from shifted register t (904) to CSA (911), signal multiplexer (908) to send input from shifted register s (905) to CSA (911), signal multiplexer (910) to send input from comparison s≠0 to CSA (911), signal multiplexer (603) to send input from register h (912) to PMU (700) and signal multiplexer (602) to send input from $n^1$ to PMU (700);

signal CSA (911) and PMU (700) to compute, storing results in registers t (901), s (902) and p (903);

signal multiplexer (907) to send input from shifted register t (904) to CSA (911), signal multiplexer (908) to send input from shifted register s (905) to CSA (911), signal multiplexer (910) to send signal from comparison w-bit s≠0 to CSA (911);

signal CSA (911) to compute, storing results in registers t (901) and s (902);

signal Finalization unit (1000) to compute, sending result to output of the device.

Figure 10:
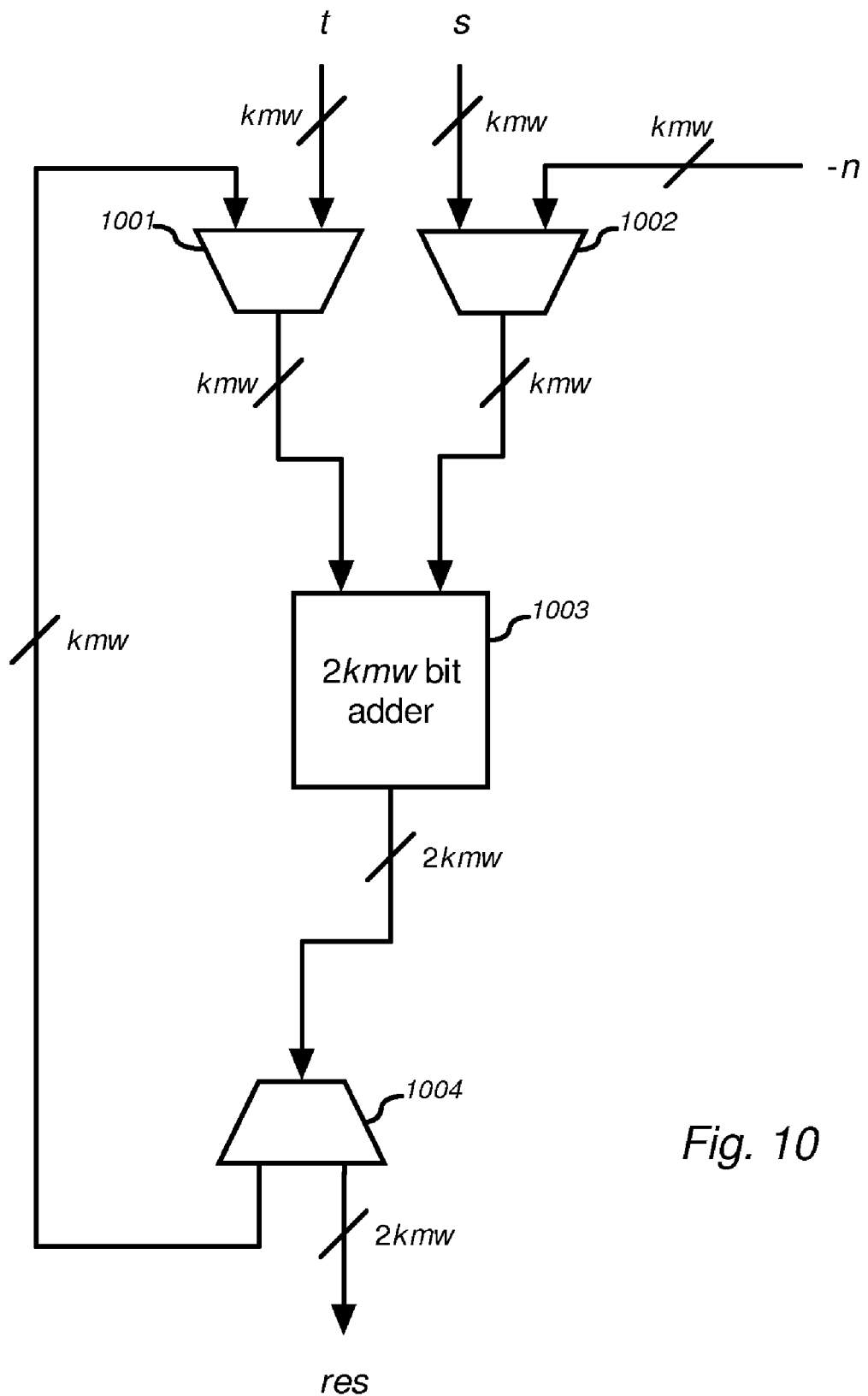
FIG. 10 shows the sub-unit that finalizes the result by adding the partial sums and subtracting the modulus if necessary. This sub-unit is used in the embodiments of FIGS. 4, 8 and 9.

FIG. 10—Preferred Embodiment of Finalization Unit

The last stage of operation of the above embodiments invokes a Finalization sub-unit, which can be embodied as a separate unit or by any other functionally equivalent means. In FIG. 10, a preferred embodiment of the Finalization unit, employing a single full adder, operates as follows:

[Phase 1]

signal multiplexer (1001) to send input from input labeled t to first input to adder (1003) and signal multiplexer (1002) to send input from input labeled s to second input to adder (1003), signal adder (1003) to compute;

[Phase 2]

if either the carry out bit of t or the carry out bit of adder (1003) is set, signal demultiplexer (1004) to send output to multiplexer (1001), otherwise signal demultiplexer (1004) to send output to the output of the sub-unit (res),

[Phase 3]

if demultiplexer (1004) is set to send output to multiplexer (1001), then signal multiplexer (1001) to send input from demultiplexer (1004), signal multiplexer (1002) to send input labeled -n, signal adder (1003) to compute, signal demultiplexer (1004) to send output to the output of the sub-unit (res).

In alternative embodiments of Finalization, functionally equivalent embodiments may employ a second full adder in a cascaded configuration.

Example Application—Exponentiation

The most common use of Montgomery multiplication is in application to modular exponentiation. We illustrate the use of this invention in such an application. Because the apparatus of the present invention provides a wider range of operability than prior art solutions, the exponentiation algorithm must be modified slightly to account for this difference. The principle difference between this and other solutions is that the intermediate results are not guaranteed to be less than the modulus. Thus a final comparison and possible subtraction are needed.

For the exponentiation algorithm, recall that n is the modulus. The algorithm computes a value less than n that is congruent to $M^e$ modulo n. Letting MonPro(a,b,n,n') denote the result of the present invention, we are guaranteed that MonPro(a,b,n,n')·R is congruent to a·b modulo n, assuming that values a, b, and n are L word values, n' is a single word value and n·n' is congruent to −1 modulo R. Also recall that $R=2^{Lw}$. For exponentiation, we also require precomputed values R1 and R2 so that R1 is less than R and congruent to R modulo n and R2 is less than R and congruent to $R^2$ modulo n. With these, the exponentiation algorithm operates via square—and multiply using residual representations:

P=MonPro(R2, M, n,n')//P is residual representation of M
Q=R1//Q residual representation of 1
for i=0 . . . $k_e$−1
  if e[i]
    Q=MonPro(Q, P, n,n')//Q is residual representation of $M^{e[i] \ldots e[0]}$
  P=MonPro(P, P, n, n')//P is residual representation of $(M^2)^i$
C=MonPro(1, Q, n,n')//C is congruent to $M^e$ modulo n and less than R
if C≥n then C−=n
return C

CONCLUSIONS

The specific embodiments of the invention that have been described herein should not be construed as limiting the scope of the invention, but merely illustrating the feasibility and currently preferred embodiments of this invention. The scope of the invention should be determined by the appended claims and their legal equivalents. Obvious variations, modifications or improvements to the specified embodiments do not depart from the invention or scope of the appended claims.

What is claimed is:

1. A scalable electronic apparatus for residual modular multiplication comprising:
a first register with capacity for storing and accessing at least 2 kmw+1 bit values;

a second register with capacity for storing and accessing at least 2 kmw+1 bit values;
a third and fourth register, each with capacity for storing and accessing at least 2 kmw bit values;
a fifth register, with capacity for storing and accessing at least a w bit value;
a carry-save adder whereby a carry-redundant representation of the sum of three multi-bit values and a single bit value can be computed;
a plural multiplier unit whereby a w-bit input x and at least km separate w-bit inputs $y_i$ yield at least km 2w-bit outputs $z_i$, each said 2w-bit output $z_i$ being the product of said w-bit input x and said w-bit input $y_i$;
a two-input full adder, wherein each input comprises at least 2 kmw bits;
a three-input full adder, wherein each input comprises at least w bits;
a two-input w×w-bit multiplier;
a w-input or gate;
a control unit;
wherein an input a is presented to the apparatus in 2 km words, an input b is presented to the apparatus in 2 km words, a modulus n is presented to the apparatus in 2 km words, the value n' is presented to the apparatus in a single word, and the least and most significant bits of said modulus n are set to 1 further comprising:
the first output of said carry-save adder routed to said first register;
the second output of said carry-save adder routed to said second register;
the output of said plural multiplier unit routed to said third register;
the least significant 2 kmw bits of said first register and said second register routed to the two inputs of said two-input full adder;
the least significant w bits of said first, second and third registers routed to said three-input w-bit full adder;
the output of said three-input w-bit full adder and said input word n' routed to the inputs of a w×w-bit multiplier;
the least significant w bits of the output of said w×w-bit multiplier routed to said fifth register.

2. A scalable apparatus according to claim 1, wherein a main finite state control unit,
signals to reset said first and second registers;
signals said plural multiplier unit to compute the products $a_0 \cdot b_{2j}$ for indices j in the range 0 through km and store result in said third register;
for i in the range 0 to 8 km−1,
signals said carry-save adder to compute results and store said two results in said first and second registers;
signals to said three-input adder to compute, then signals said w×w-bit multiplier to compute,
signals said fifth register to store lower word of the output of said w×w-bit multiplier;
signals said two input full adder to compute and store the result in said fourth register;
if said two input full adder generates a carry out, signals to add the two's complement of said modulus n to the contents of said fourth register;
signals to present contents of said fourth register as output of the device.

3. A scalable apparatus according to claim 2 wherein for each stage i in the range 0 through 8 km−1, said a control module:
routes to the first input of said carry-save adder a value selected from the group consisting of the contents of said first register and the highest significance 2 kmw bits of said first register padded with 0's in the most significant w bits;
routes to the second input of said carry-save adder a value selected from the group consisting of the contents of said second register and the highest significance 2 kmw bits of said second register padded with 0's in the most significant w bits;
routes to the third input of said carry-save adder a value selected from the group consisting of the contents of said third register padded with 0 in the most significant w bits, and the contents of said third register shifted up one w bits and padded with 0's in the least significant w bits;
routes to the fourth input of said carry-save adder a bit value selected from the group consisting of the value 0, and the value output of said w input or gate;
routes to the input of said plural multiplier, a kmw-bit value selected from the group consisting of
the even indexed words of said input b, that is, the bits indexed by 2jw+g for j in the range 0 through km−1 and for g in the range 0 through w−1;
the odd indexed words of said input b, that is, the bits indexed by 2jw+w+g for j in the range 0 through km−1 and for g in the range 0 through w−1;
the even indexed words of said input modulus n, that is, the bits indexed by 2jw+g for j in the range 0 through km−1 and for g in the range 0 through w−1;
the odd indexed words of said input modulus n, that is, the bits indexed by 2jw+w+g for j in the range 0 through km−1 and for g in the range 0 through w−1.

4. A scalable apparatus according to claim 1, wherein a predetermined positive integer k is 1 and said plural multiplier unit comprises a plurality of m separate w×w-bit multipliers operable in parallel such that said w-bit input x of said plural multiplier unit is routed to the first input of each said multiplier, for j in the range 0 through m, the said w-bit input $y_j$ is routed to the second input of said j-th multiplier, and for j in the range 0 through m, the double word output of said j-th multiplier is routed to the j-th output of said plural multiplier unit.

5. A scalable apparatus according to claim 2, wherein a predetermined positive integer k is greater than 1 and said plural multiplier unit comprises: a plurality of m separate w×w-bit multipliers operable in parallel; a plurality of m separate k−1 multiplexers for w-bit buses; a plurality of m separate internal registers, each capable of storing and accessing a 2w-bit value; a secondary finite state control unit, which may be integrated as part of said main finite state control unit, wherein:
said w-bit input of said plural multiplier unit is routed to the first input of each said multiplier;
for j in the range 0 through k−1, the output of said j-th multiplexer is routed to the input of said j-th multiplier;
for j in the range 0 through k−1 and for g in the range 0 through m−1, said w-bit input value $y_{jm+g}$ is routed to the input indexed g of said j-th multiplexer;
for j in the range 0 through k−1 and for g in the range 0 through m−1, said 2w-bit output of said g-th multiplier is routed to said internal register indexed by jm+g;
for j in the range 0 through k−1 and for g in the range 0 through m−1, the output of said internal register indexed by jm+g is routed to the output of said plural multiplier unit also indexed by jm+g.

6. A scalable apparatus for residual modular multiplication according to claim 5, wherein for j in the range 0 through k−1, said secondary finite state control unit: simultaneously signals each said multiplexer to select the j-th input; simultaneously signals each said multiplier to compute; simultaneously for g in the range 0 through m−1, signals said internal register indexed by jm+g to record its input.

* * * * *